US012121492B2

(12) United States Patent
Greenwald

(10) Patent No.: US 12,121,492 B2
(45) Date of Patent: Oct. 22, 2024

(54) CRUTCH CONTAINER

(71) Applicant: Robert Greenwald, Fredricksburg, OH (US)

(72) Inventor: Robert Greenwald, Fredricksburg, OH (US)

( * ) Notice: Subject to any disclaimer, the term of this patent is extended or adjusted under 35 U.S.C. 154(b) by 160 days.

(21) Appl. No.: 17/941,086

(22) Filed: Sep. 9, 2022

(65) Prior Publication Data

US 2023/0125902 A1 Apr. 27, 2023

Related U.S. Application Data

(60) Provisional application No. 63/271,737, filed on Oct. 26, 2021.

(51) Int. Cl.
*A61H 3/02* (2006.01)
*A61H 3/00* (2006.01)

(52) U.S. Cl.
CPC ......... *A61H 3/02* (2013.01); *A61H 2003/002* (2013.01); *A61H 2003/0272* (2013.01)

(58) Field of Classification Search
CPC ................................................ A61H 2003/002
See application file for complete search history.

(56) References Cited

U.S. PATENT DOCUMENTS 2,311,049 A * 2/1943 Hedden .................... A61H 3/02 224/0.5
4,146,045 A 3/1979 Grant
4,289,156 A * 9/1981 Ulics ........................ A61H 3/00 D3/10
4,295,483 A 10/1981 Smith
4,850,383 A 7/1989 McBride
4,974,760 A * 12/1990 Miller ...................... A61H 3/00 224/407
5,465,884 A * 11/1995 Bohl ........................ A45B 1/00 224/407
6,026,833 A * 2/2000 Conte ...................... A61H 3/02 224/407
7,243,667 B2 7/2007 Floriani
8,146,614 B2 * 4/2012 Ford ........................ A45B 3/00 224/407
9,545,355 B1 1/2017 Welch
2002/0056736 A1 5/2002 Conte
2006/0137728 A1 * 6/2006 Floriani ................... A61H 3/02 224/407
2007/0228094 A1 10/2007 Bednarz

* cited by examiner

*Primary Examiner* — Noah Chandler Hawk
(74) *Attorney, Agent, or Firm* — Boudwin Intellectual Property Law, LLC; Daniel Boudwin

(57) ABSTRACT

A crutch container includes a container housing having a rear wall opposite a front wall and a pair of lateral sidewalls extending therebetween. The container housing includes an open upper end opposite a closed lower end defining an interior volume. A height of the rear wall is greater than a height of the front wall and the pair of lateral sidewalls defining an upper panel. A strap is affixed to a rear surface of the rear wall along the upper panel, wherein each of a first end and a second end of the strap are removably securable to a front surface of the rear wall along the upper panel. A wedge extends from the rear surface of the rear wall adjacent to the closed lower end, wherein the wedge frictionally engages between a pair of inwardly tapering posts of a crutch.

19 Claims, 4 Drawing Sheets

CRUTCH CONTAINER

CROSS REFERENCE TO RELATED APPLICATIONS

This application claims the benefit of U.S. Provisional Application No. 63/271,737 filed on Oct. 26, 2021. The above identified patent application is herein incorporated by reference in its entirety to provide continuity of disclosure.

BACKGROUND OF THE INVENTION

The present invention relates to item containers and caddies. More particularly, the present invention pertains to a container configured to removably secure to a crutch between the posts of the crutch to provide access to assorted items stored therein while utilizing the pair of crutches.

Walking with crutches can be a difficult process requiring coordination and utilizing both of the user's hands. Typically, as the user must grip both crutches to support their body weight in an elevated position above a ground surface, individuals are unable to carry or otherwise transport items from location to location while crutch bound. Attempting to carry items while using crutches risks improperly supporting the user's body weight, leading to imbalances that can increase the potential for slips and falls, thereby increasing the risk of injury. Furthermore, falling from crutches can exacerbate any injuries or conditions that required the use of crutches in the first place. In order to safely carry items, an individual may require the assistance of another individual. However, assistance may not always be available. Alternatively, the individual may utilize a supplemental bag or backpack, however, such bags may produce an unbalanced load, adding additional weight that may make crutch usage cumbersome and dangerous. Additionally, as the bag is secured directly to the user, the amount of weight the user must support on their arms is increased, leading to strain and discomfort. Therefore, a device that can store several items on one or more crutches while not unbalancing or otherwise impeding the user is desired.

In light of the devices disclosed in the known art, it is submitted that the present invention substantially diverges in design elements from the known art and consequently it is clear that there is a need in the art for an improvement to existing containers. In this regard, the instant invention substantially fulfills these needs.

SUMMARY OF THE INVENTION

In view of the foregoing disadvantages inherent in the known types of portable containers now present in the known art, the present invention provides a crutch container wherein the same can be utilized for providing convenience for the user when carrying assorted items while operating a pair of crutches.

The present system comprises a container housing having a rear wall opposite a front wall and a pair of lateral sidewalls extending therebetween. The container housing includes an open upper end opposite a closed lower end defining an interior volume. A height of the rear wall is greater than a height of the front wall and the pair of lateral sidewalls defining an upper panel. A strap is affixed to a rear surface of the rear wall along the upper panel, wherein each of a first end and a second end of the strap are removably securable to a front surface of the rear wall along the upper panel. A wedge extends from the rear surface of the rear wall adjacent to the closed lower end, wherein the wedge is configured to frictionally engage between a pair of inwardly tapering posts of a crutch.

In some embodiments, the strap is disposed parallel to an upper edge of the rear wall. In another embodiment, a fastener is disposed on each of the first end and the second end of the strap, wherein each fastener is removably securable to a complementary fastener disposed on the front surface of the rear wall. In other embodiments, the container housing comprises a waterproof material. In yet another embodiment, the container housing comprises rubber. In some embodiments, the pair of lateral sidewalls taper inwardly towards the closed lower end, such that a distance between the pair of lateral sidewalls at the closed lower end is less than a distance between the pair of lateral sidewalls at the open upper end. In another embodiment, the wedge comprises an upper border opposite a lower border and a pair of lateral edges extending therebetween. In other embodiments, the wedge comprises a compressible material configured to frictionally engage between the pair of inwardly tapering posts of the crutch. In yet another embodiment, the upper border is disposed parallel to the lower border. In some embodiments, the pair of lateral edges taper inwardly towards the lower border, such that a length of the lower border is less than a length of the upper border. In another embodiment, the container housing and the wedge comprise a unitary construction. In other embodiments, wherein the strap is affixed to the rear wall via a pair of securement fasteners. In yet another embodiment, a spacer is disposed between each of the pair of securement fasteners and the rear surface of the rear wall. In some embodiments, the rear wall comprises a planar structure. In another embodiment, an exterior surface of the front wall and the pair of lateral sidewalls comprise a plurality of textured elements thereon. In other embodiments, the upper edge of the rear wall rests flush with an upper side of the strap. In yet another embodiment, the strap comprises a pair of arcuate portions extending substantially perpendicularly from the rear surface of the rear wall, wherein each of the pair of arcuate portions are configured to contour about a post of the pair of inwardly tapering posts of the crutch. In some embodiments, the pair of arcuate portions comprise preformed unitary structures defined within the strap.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
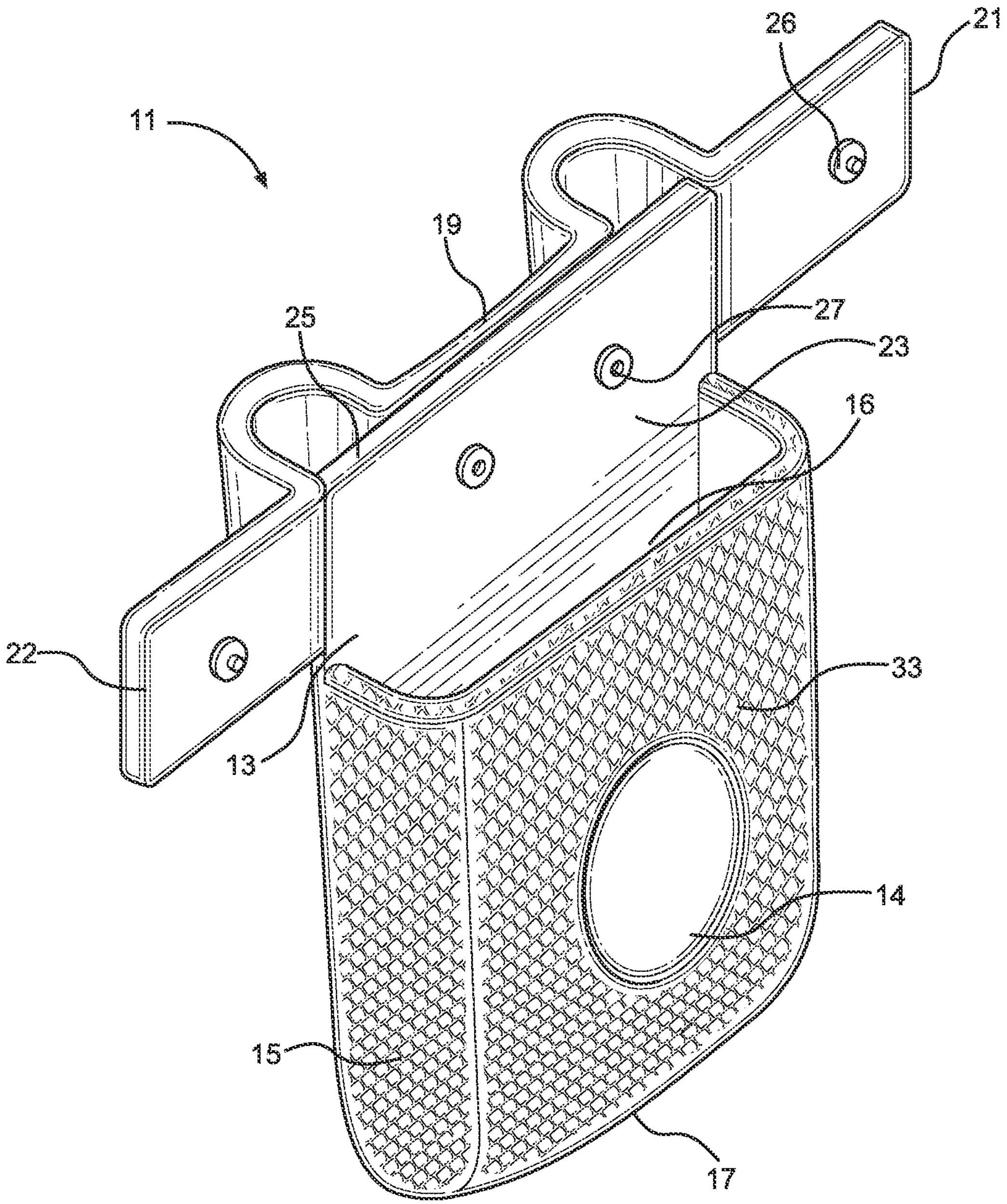
FIG. 1 shows a perspective view of an embodiment of the crutch container.

Reference is made herein to the attached drawings. Like reference numerals are used throughout the drawings to depict like or similar elements of the crutch container. The figures are intended for representative purposes only and should not be considered to be limiting in any respect.

Referring now to FIG. 1, there is shown a perspective view of an embodiment of the crutch container. The crutch container 11 includes a container housing having a rear wall 13 disposed opposite a front wall 14 and a pair of lateral sidewalls 15 extending therebetween. The container housing further includes an open upper end 16 opposite a closed lower end 17 to define an interior volume therebetween. A height of the rear wall 13 is greater than a height of the front wall 14 and the pair of lateral sidewalls 15, thereby defining an upper panel extending beyond the open upper end 16. The upper panel comprises the portion of the rear wall 13 disposed between the open upper end 16 and an upper edge 25 of the rear wall 13. In alternate embodiments, the crutch container 11 comprises a closure flap affixed to a front surface 23 of the rear wall 13 along the upper panel proximal to the open upper end 16, wherein the closure flap is configured to fold over the open upper end 16 to encapsulate the interior volume. In this manner, the closure flap prevents objects stored within the interior volume from exiting the interior volume during use. In some such embodiments, the closure flap is unitary with the rear wall 13. In such embodiments, the closure flap can further include a closure fastener on an interior surface thereof, the closure fasteners configured to engage a complementary fastener disposed on the exterior surface of the front wall 14. Similarly, in alternate embodiments, the front wall 14 is configured to selectively close the open upper end 16 via a closure fastener disposed on an interior surface of the front wall 14 and a complementary closure fastener disposed on the front surface 23 of the rear wall 13. In the illustrated embodiment, the pair of lateral sidewalls 15 taper radially inwardly towards the closed lower end 17, such that a linear distance between the pair of lateral sidewalls 15 at the closed lower end 17 is less than a linear distance between the pair of lateral sidewalls 15 at the open upper end 16. In this manner, the container housing defines a rounded lower end to reduce projecting sharp edges that could contact obstacles in the surrounding area during use. In some embodiments, the crutch container 11 is contemplated to comprise a material having an increased coefficient of friction, such as rubber, neoprene, or the like, such that the crutch container 11 frictionally engages crutches of differing shapes and sizes. Additionally, in other embodiments, the crutch container 11 is contemplated to comprise waterproof materials to ensure the contents of the crutch container may remain dry in inclement weather. In the shown embodiment, an exterior surface of the front wall 14 and the pair of lateral sidewalls comprises a plurality of textured elements 33 thereacross, wherein the plurality of textured elements 33 are configured to increase surface area to facilitate frictional engagement with the user and existing crutch systems.

Figure 2:
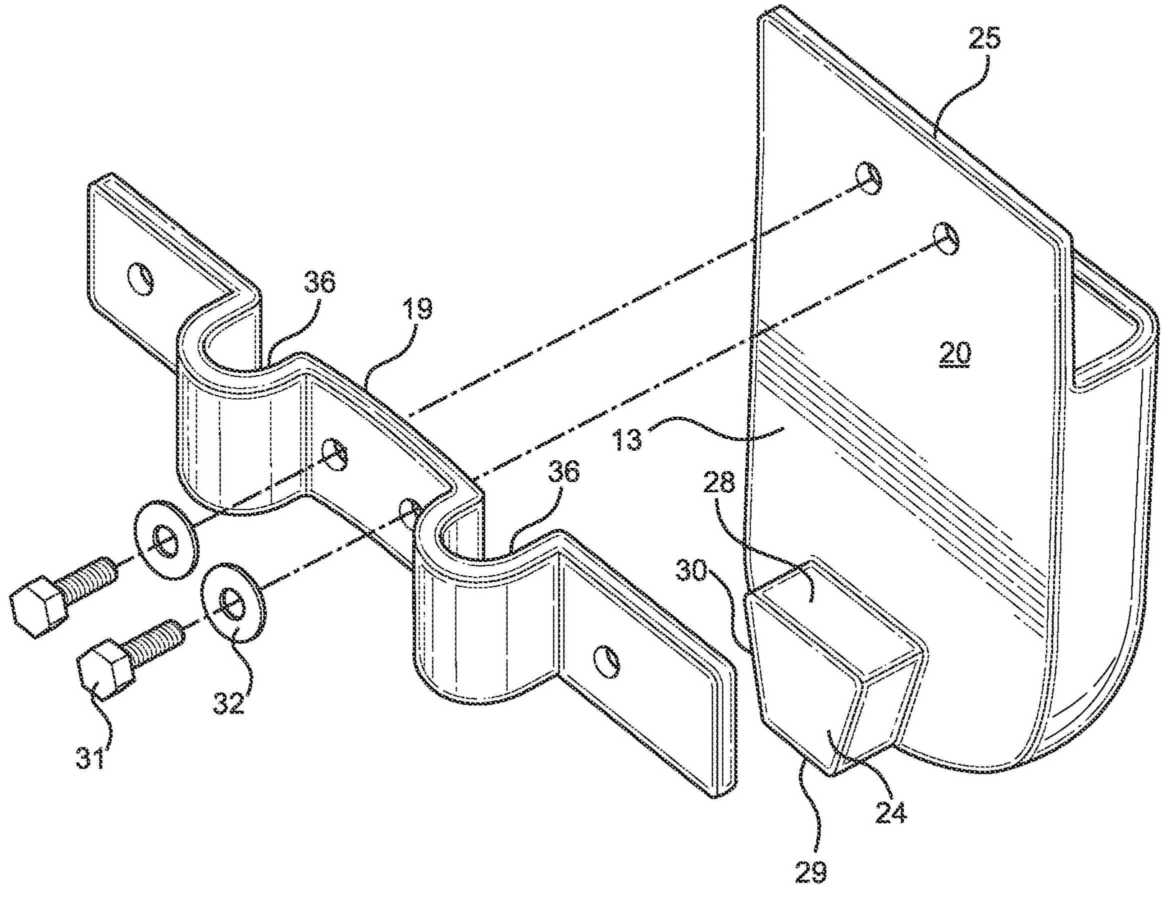
FIG. 2 shows an exploded view of an embodiment of the crutch container.

A strap 19 is affixed to a rear surface (as shown in FIG. 2, 20) of the rear wall 13, wherein the strap 19 further comprises a first end 21 disposed opposite a second end 22. In the shown embodiment, the strap 19 is disposed parallel to the upper edge 25 of the rear wall 13. A fastener 26 is disposed on each of the first and second ends 21, 22 of the strap 19, wherein the fastener 26 is configured to engage a complementary fastener 27 disposed on the front surface 23 of the rear wall 13 on the upper panel. In the illustrated embodiment, the fastener 26 and the complementary fastener 27 comprise a snap fastener system, however, in other embodiments, alternate fastening means are contemplated, such as magnetic fasteners, mechanical fasteners, threaded fasteners configured to secure to a bolt or other fastener, or the like. The strap 19 is configured to secure about the posts of an existing crutch to removably secure the crutch container 11 thereto. In the shown embodiment, the strap 19 comprises a pair of preformed arcuate portions (as shown in FIG. 2, 36) configured to contour about a substantially cylindrical substrate, such as the posts of a traditional crutch system. Such preformed structures may be necessary in embodiments where the strap 19 comprises increased thickness or materials having reduced flexibility, however, the strap 19 is also contemplated to comprise a substantially planar structure configured to flex about the posts of existing crutch systems. In the illustrated embodiment, an upper side of the strap 19 is flush with the upper edge 25 of the rear wall 13. The strap 19 is further contemplated to comprise the same material as the container housing.

Figure 3:
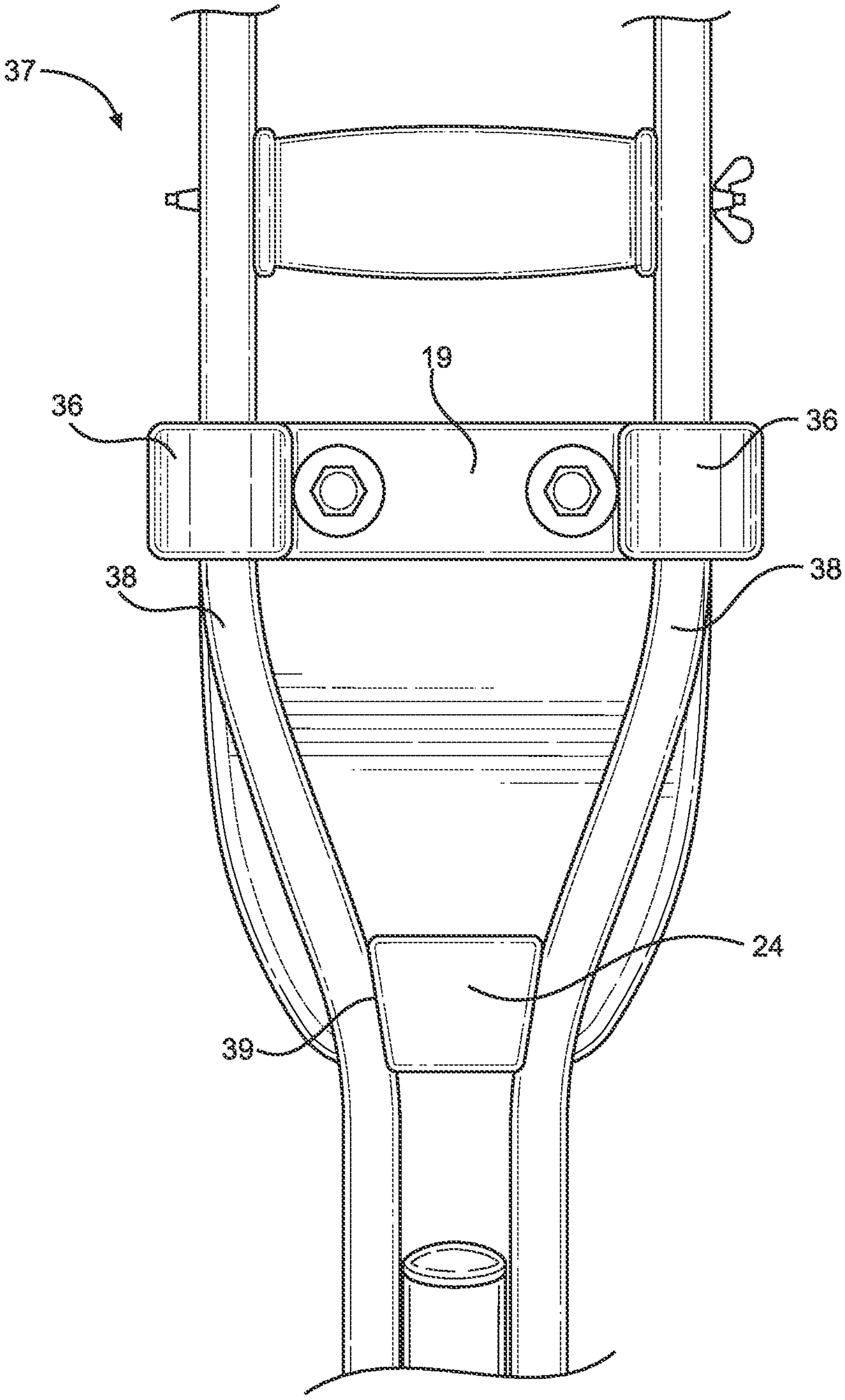
FIG. 3 shows a rear view of an embodiment of the crutch container affixed to a crutch.

Referring now to FIG. 2, there is shown an exploded view of an embodiment of the crutch container. A wedge 24 extends from the rear surface 20 of the rear wall 13 adjacent to the closed lower end, wherein the wedge 24 is configured to frictionally engage a crutch between the pair of inwardly projecting posts (as shown in FIG. 3, 38). In the shown embodiment, the rear wall 13 comprises a planar structure defining a planar rear surface 20. The wedge 24 removably secures the lower end of the crutch container to the crutch, preventing lateral movement and acting as a stopper to prevent the crutch container from sliding along a height of the crutch. The wedge 24 comprises a compressible material configured to compress between a narrowing between the pair of inwardly projecting posts of the crutch, such that the wedge 24 expands to frictionally engage the crutch. In the illustrated embodiment, the wedge 24 comprises an upper border 28 disposed opposite a lower border 29 and a pair of lateral edges 30 extending therebetween. In some embodiments, the lower border 29 of the wedge 24 is flush with the closed lower end. The upper border 28 is disposed parallel to the lower border 29, and the pair of lateral edges 30 taper inwardly towards the lower border 29, such that a length of the lower border 29 is less than a length of the upper border 28. In this manner, the wedge 24 is dimensioned to secure within the narrowing defined between the pair of inwardly projecting posts to removably secure the container housing to the crutch system. In the shown embodiment, the wedge 24 and the container housing comprise a unitary construction, such that wedge 24 does not separate from the container housing under external stresses.

In the illustrated embodiment, the strap 19 is removably securable to the rear wall 13 via one or more securement fasteners 31. In the shown embodiment, the securement fasteners 31 comprise mechanical fasteners, such as bolts, however, alternate means of securing the strap 19 to the rear wall 13 are contemplated, including snap fasteners, adhesives, magnetic fasteners, and the like. In the shown embodiment, the securement fasteners 31 are secured through apertures disposed through the strap 19 and complementary apertures disposed through the rear wall 13, whereupon fasteners can be affixed to the securement fasteners 31 opposite the rear wall 13 to retain the strap in position. Furthermore, in the shown embodiment, spacers 32 are disposed between the securement fasteners 31 and the strap 19 to disperse the forces placed upon the strap by the securement fasteners 31 and thereby minimize wear and tear on the strap 19. A pair of arcuate portions 36 are preformed within the strap 19 and unitary therewith, such that the pair of arcuate portions 36 are configured to contour about the posts of a crutch system. In the shown embodiment, the pair of arcuate portions 36 extend substantially perpendicularly from the rear surface 20 of the rear wall 13 when the strap 19 is secured thereto.

Referring now to FIG. 3, there is shown a rear view of an embodiment of the crutch container affixed to a crutch. In the illustrated embodiment, the crutch container is affixed to a crutch 37, wherein the pair of arcuate portions 36 of the strap 19 are disposed about and frictionally engaging the pair of inwardly projecting posts 38 of the crutch 37. The wedge 24 is further frictionally engaged within a neck 39 disposed between the pair of inwardly projecting posts 38, wherein the neck 39 is defined at a narrowest point between the pair of inwardly projecting posts 38. In the shown embodiment, the inwardly tapering lateral edges of the wedge 24 contour to the neck 39 increasing the surface area in contact therewith, and thereby increasing frictional engagement with the crutch 37. In this manner, the wedge 24 retains the lower end of the crutch container to the crutch 37 while the strap 19 removably secures the upper end of the crutch container to the crutch 37. As shown in the illustrated embodiment, the construction of the crutch container positions the device below a handle of the crutch 37, such that the objects disposed within the interior volume of the crutch container are retained in close proximity to the user's hand during use.

Figure 4:
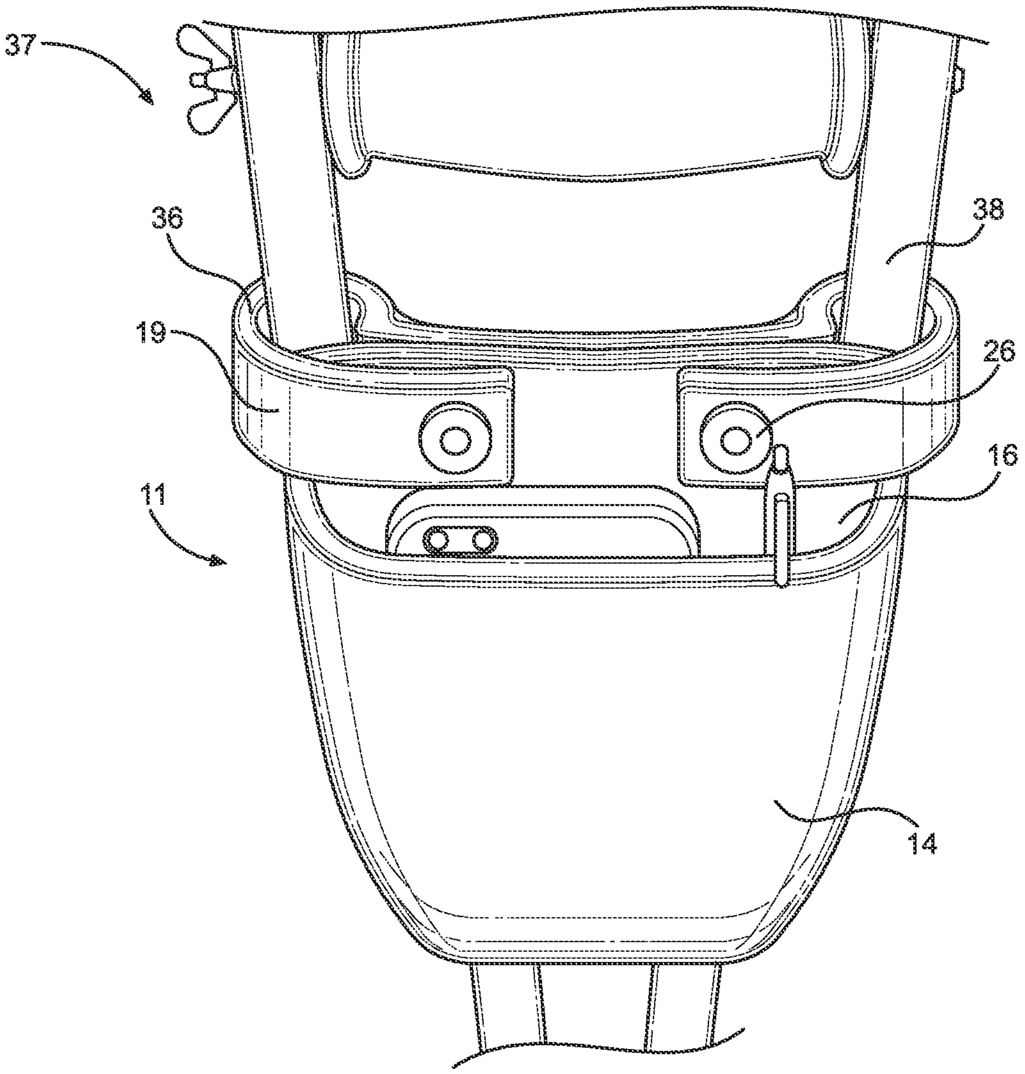
FIG. 4 shows a perspective view of an embodiment of the crutch container in use.

Referring now to FIG. 4, there is shown a perspective view of an embodiment of the crutch container in use. In one use, the crutch container 11 is removably secured to an existing crutch 37 via the strap 19 and frictional engagement of the wedge between the inwardly projecting posts of the crutch as previously described herein. The strap 19 can be flexed to contour about the pair of inwardly projecting posts 38, or alternatively, the preformed arcuate portions 36 of the strap 19 may be positioned to contour about the pair of inwardly projecting posts 38. The first and second ends of the strap 19 can then be wrapped about the rear wall to secure to the front surface thereof via the pair of fasteners 26 engaging complementary fasteners disposed on the front surface of the rear wall. Once the strap 19 is disposed about the pair of inwardly projecting posts 38, the wedge can be placed within the neck between the pair of inwardly projecting posts 38 to frictionally engage the crutch 37. Once secured to the crutch 37, assorted items can be stored within the interior volume via insertion through the open upper end 16. In the shown embodiment, the objects may further engage the front wall 14 to more securely retain the objects therein. As the user travels using the crutches 37, the objects are retained therein without unnecessarily impeding the user's ability to safely travel. In this manner, the crutch container 11 provides a safe and efficient means for transporting various objects without increasing the effort required by the user or the risk of falling due to an unbalanced load.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A crutch container, comprising:

a container housing having a rear wall opposite a front wall and a pair of lateral sidewalls extending therebetween;

wherein the container housing includes an open upper end opposite a closed lower end defining an interior volume;

wherein a height of the rear wall is greater than a height of the front wall and the pair of lateral sidewalls defining an upper panel;

wherein each of a first end and a second end of a strap are removably securable to a front surface of the rear wall along the upper panel;

a wedge extending from the rear surface of the rear wall adjacent to the closed lower end;

wherein the wedge is configured to frictionally engage between a pair of inwardly tapering posts of a crutch; and wherein the strap is affixed to the rear wall via a pair of securement fasteners.

2. The crutch container of claim 1, wherein the strap is disposed parallel to an upper edge of the rear wall.

3. The crutch container of claim 1, wherein a fastener is disposed on each of the first end and the second end of the strap.

4. The crutch container of claim 1, wherein the container housing is made of a waterproof material.

5. The crutch container of claim 1, wherein the container housing is made of rubber.

6. The crutch container of claim 5, wherein each fastener is removably securable to a complementary fastener disposed on the front surface of the rear wall.

7. The crutch container of claim 1, wherein the pair of lateral sidewalls taper inwardly towards the closed lower end, such that a distance between the pair of lateral sidewalls at the closed lower end is less than a distance between the pair of lateral sidewalls at the open upper end.

8. The crutch container of claim 1, wherein the wedge includes a compressible material configured to frictionally engage between the pair of inwardly tapering posts of the crutch.

9. The crutch container of claim 1, wherein the wedge includes an upper border opposite a lower border and a pair of lateral edges extending therebetween.

10. The crutch container of claim 9, wherein the pair of lateral edges taper inwardly towards the lower border, such that a length of the lower border is less than a length of the upper border.

11. The crutch container of claim 9, wherein the upper border is disposed parallel to the lower border.

12. The crutch container of claim 1, wherein the container housing and the wedge include a unitary construction.

13. The crutch container of claim 1, further comprising a spacer disposed between each of the pair of securement fasteners and the rear surface of the rear wall.

14. The crutch container of claim 1, wherein the rear wall includes a planar structure.

15. The crutch container of claim 1, wherein an exterior surface of the front wall and the pair of lateral sidewalls include a plurality of textured elements thereon.

16. The crutch container of claim 1, wherein the upper edge of the rear wall rests flush with an upper side of the strap.

17. The crutch container of claim 1, wherein the strap includes a pair of arcuate portions extending substantially perpendicularly from the rear surface of the rear wall.

18. The crutch container of claim 17, wherein the pair of arcuate portions include preformed unitary structures defined within the strap.

19. The crutch container of claim 17, wherein each of the pair of arcuate portions are configured to contour about a post of the pair of inwardly tapering posts of the crutch.

* * * * *